225-48
SEARCH R
Oct. 12, 1965
K. T. BUTTERY ETAL
PAPER DISPENSING CARTON
Re. 25,876
Orig. 3128,025
Original Filed Feb. 4, 1963
3 Sheets-Sheet 1
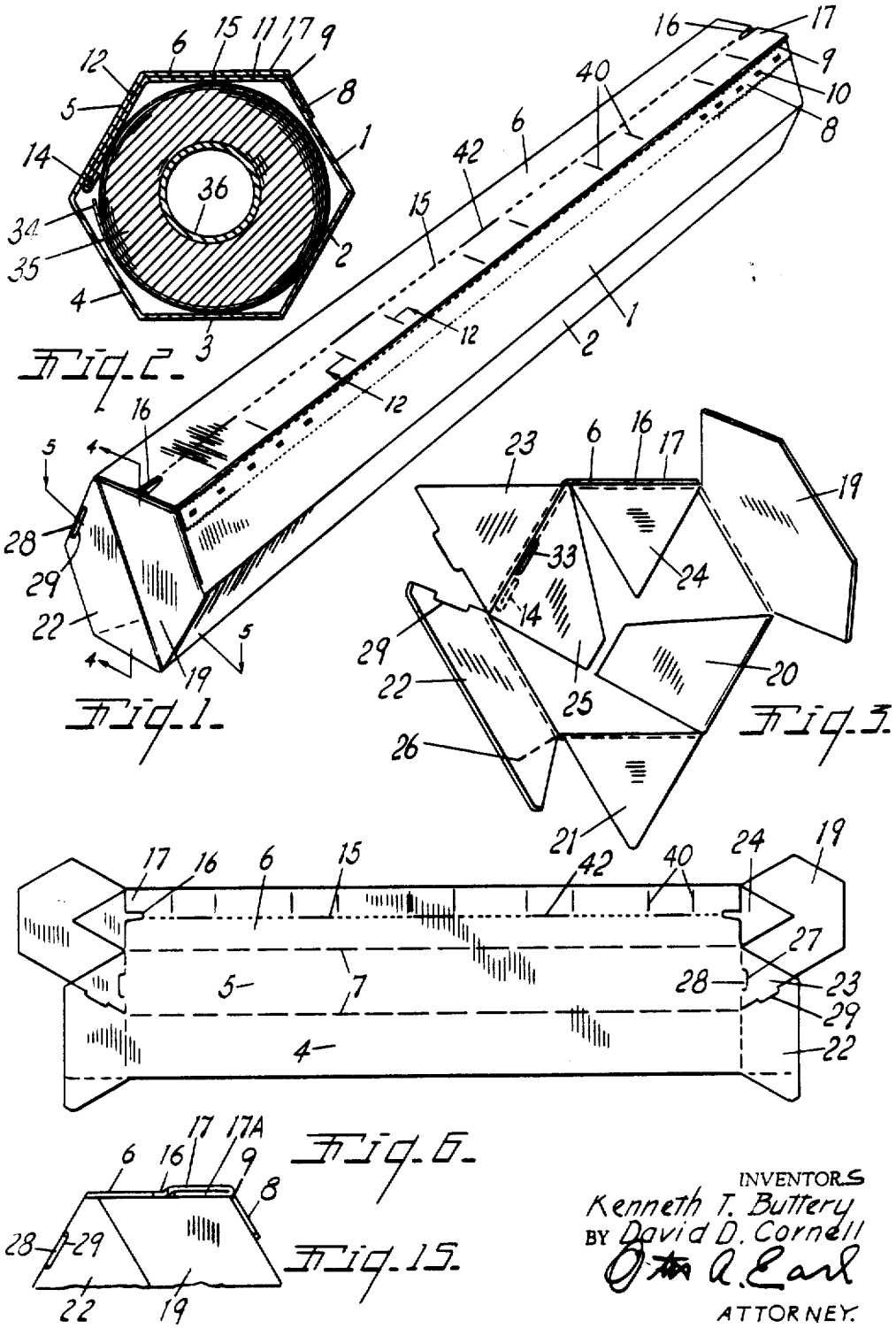
INVENTORS
Kenneth T. Buttery
BY David D. Cornell
Otto A. Earl
ATTORNEY.

PAPER DISPENSING CARTON
Original Filed Feb. 4, 1963
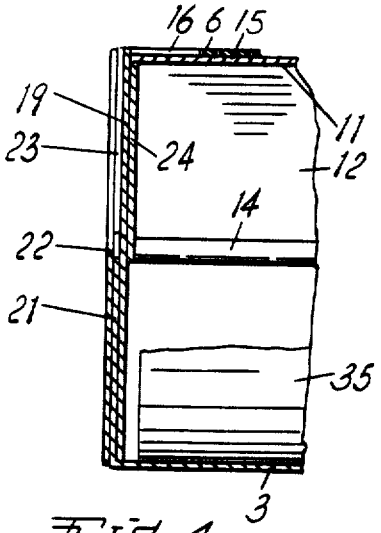
Fig. 4.
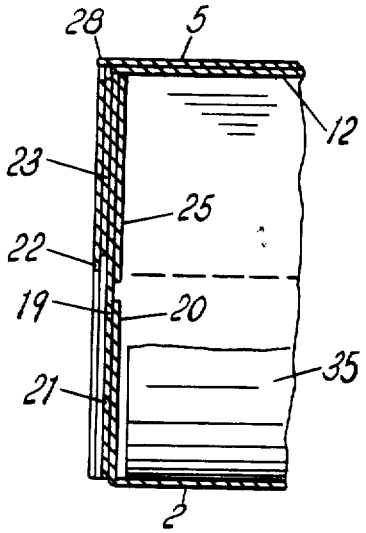
Fig. 5.
Fig. 7.
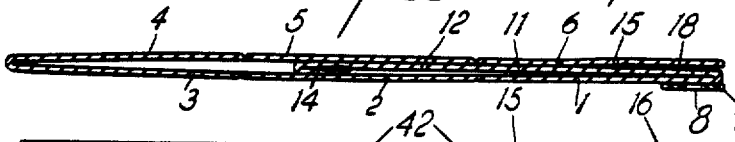
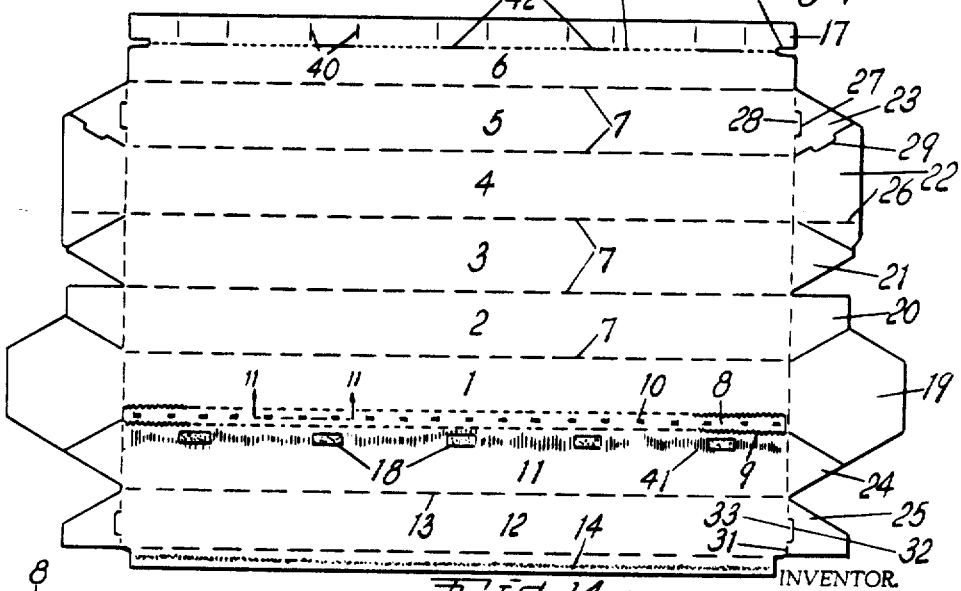
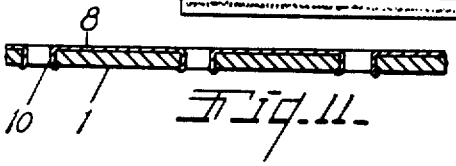
Fig. 11.
Fig. 14.
INVENTOR.
Kenneth T. Buttery
BY David D. Corgell
Otis R. Earl
ATTORNEY.

PAPER DISPENSING CARTON
Original Filed Feb. 4, 1963 3 Sheets-Sheet 3
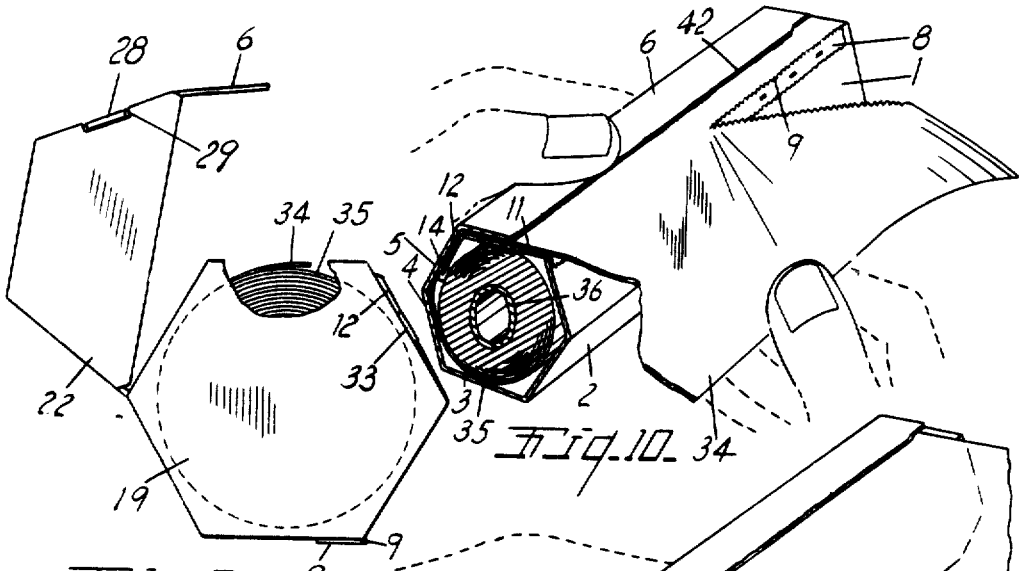
Fig. 8.
Fig. 10.
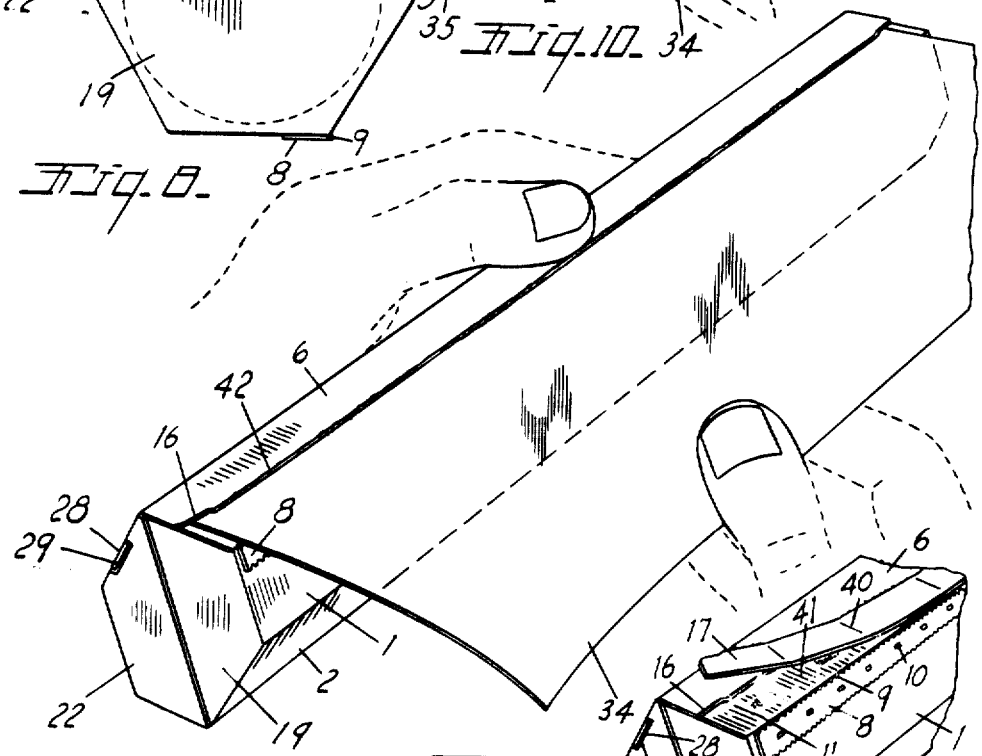
Fig. 9.
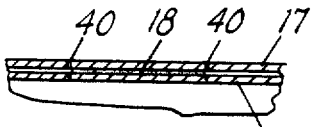
Fig. 12.
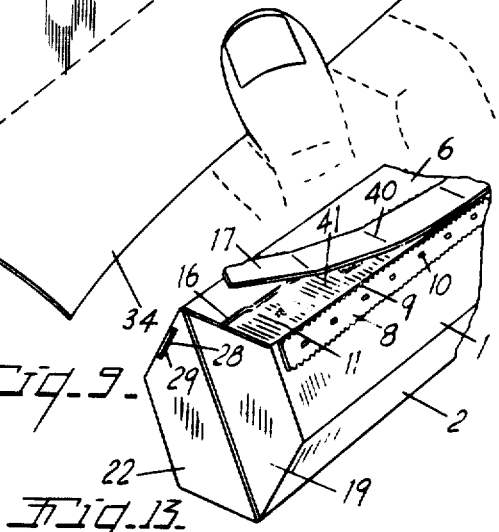
Fig. 13.
INVENTOR.
Kenneth T. Buttery
BY David D. Cornell
ATTORNEY.

United States Patent Office

Re. 25,876
Reissued Oct. 12, 1965

25,876
PAPER DISPENSING CARTON

Kenneth T. Buttery, Kalamazoo, and David D. Cornell, Portage, Mich., assignors to KVP Sutherland Paper Company, Kalamazoo, Mich.

Original No. 3,128,025, dated Apr. 7, 1964, Ser. No. 256,022, Feb. 4, 1963. Application for reissue Mar. 29, 1965, Ser. No. 457,235
25 Claims. (Cl. 225—48)

Matter enclosed in heavy brackets [ ] appears in the original patent but forms no part of this reissue specification; matter printed in italics indicates the additions made by reissue.

This invention relates to improvements in paper dispensing cartons.

The main objects of this invention are:

First, to provide a dispensing carton which is well adapted for packaging and dispensing of a roll of film-like sheet material and for packaging and dispensing paper of fibrous type and one which may be formed of relatively light stock and at the same time is strong and durable for packaging and for handling.

Second, to provide a dispensing carton for rolled stock which is effectively sealed for storage, shipment and merchandizing and which may be quickly and easily opened for dispensing of the packaged stock therefrom and which is form retaining and rigid in such dispensing use and handling.

Third, to provide a dispensing carton from which the materials may be readily withdrawn in the desired amount and the material clamped relative to the blade so that it is cut or severed on a straight line and is not likely to be othewise torn or fractured.

Fourth, to provide a dispensing carton having these advantages which may be economically produced and in which there is a relatively small amount of stock waste in the formation thereof.

Objects relating to details and economies of the invention will appear from the description to follow. The invention is defined and pointed out in the claims.

A preferred embodiment of the invention is illustrated in the accompanying drawing, in which:

FIG. 1 is a perspective view of a closed carton embodying our invention.

FIG. 2 is a somewhat enlarged transverse sectional view through the carton with a roll of conventionally illustrated stock therein illustrating the carton and the contents as originally packaged.

FIG. 3 is an enlarged fragmentary end elevational view of the carton with the walls in erected position but with the end flaps positioned to show details thereof.

FIG. 4 is an enlarged fragmentary longitudinal section on a line corresponding to line 4—4 of FIG. 1.

FIG. 5 is an enlarged fragmentary longitudinal section on a line corresponding to line 5—5 of FIG. 1.

FIG. 6 is a plan view of the collapsed carton, the securing means for the end members and end flaps not being illustrated.

FIG. 7 is an enlarged transverse sectional view of the collapsed carton.

FIG. 8 is an end elevational view of a desirable form of carton embodying our invention with the walls erected and the carton open to deliver the edge of the stock.

FIG. 9 is a perspective view illustrating the manner in which the carton may be grasped for withdrawing the stock therefrom, the removable sealing portion or section of one wall of the carton having been removed.

FIG. 10 is a perspective view in cross section further illustrating how the carton may be manipulated in the withdrawing of stock therefrom and the severing of the withdrawn section of stock.

FIG. 11 is an enlarged fragmentary view illustrating details of securing of the cutter blade to the carton blank so that it constitutes a fixed and reinforcing element thereof.

FIG. 12 is an enlarged fragmentary view on a line corresponding to line 12—12 of FIG. 1 illustrating certain structural details.

FIG. 13 is a fragmentary perspective view illustrating initial steps in the removal of the tear strip and the relationship thereof and other parts to the cutter blade.

FIG. 14 is a plan view of the blank in its extended position with the cutter blade mounted thereon with adhesive and adhesive repellent conventionally illustrated.

FIG. 15 is a fragmentary end elevational view of a modified form of our invention.

It should be understood that "paper" is used in its broad sense and that the carton is adapted for use for packaging and dispensing film stock or film-like material as distinguished from what is commonly designated "Paper."

The embodiment of our invention illustrated is of hexagonal cross section and is formed integrally of paperboard stock cut and scored to provide the outer walls 1, 2, 3, 4, 5 and 6 which are hingedly connected by the scores 7 conventionally indicated.

The cutter blade 8 is secured to the wall 1 so that its edge 9 which is desirably serrated as is indicated projects slightly from the wall 1 when the carton is in erected position and is fixedly secured as by means of the integral lugs 10 struck inwardly therefrom, see FIG. 11. This not only provides an effective means for securing the blade but the blade constitutes a reinforcing member for the wall 1 which is subjected to some stress when the paper is being removed from the roll of stock within the container.

The inner wall 11 is hingedly connected to the edge of the outer wall 1 by suitable hinging scores and disposed on the edge of the outer wall 6 and is substantially the same dimensions as the outer wall.

A second support member 12 is hingedly connected at 13 to the inner edge of the wall member 11 and terminates at its inner edge in the reverse fold 14, see FIG. 2, which provides a smooth guiding edge for the stock as it is unwound from the roll in withdrawing the same from the container.

The removable portion 17 of the outer wall 6 is, in the embodiment illustrated, provided with transverse slits 40 disposed at the ends of the spaced adhesive sections 18, the adhesive being conventionally shown in the drawing. In the embodiment of our invention illustrated the removable strip or section 17 which is detachably secured by the adhesive is provided with transverse slits 40 which serve the double purpose of adding to the flexibility of the tear strip as will be pointed out and also to prevent tearing or stripping of portions of the removable strip which might disfigure. Further, the portions of the wall 11 between the spaced adhesive supports is provided with adhesive resisting material *41*, conventionally illustrated in FIG. 14. *Additionally, as shown in FIG. 14, the inner wall 11 is provided with scores therein surrounding the adhesive sections 18.*

To further facilitate removal of the strip 17 and minimize tearing, the severing line 15 includes spaced slits 42 transversely aligned with the adhesive sections 18. These longitudinal and transverse slits 40 and 42 of the removable sections not only serve to minimize disfiguring fractures but they are of substantial advantage in that they facilitate grasping of the tear strip aljacent its adhered portion.

In practice one end of the tear strip is grasped, the operator grasping the carton with the thumb engaging the outer wall section 6, or the carton may be positioned on a shelf or table or other support and the operator merely presses on the section of the wall 6 and with his other hand grasps the removable section 17 and pulls or detaches it from the inner wall 11. When the carton is erected and before removing the section 17, as illustrated in FIGS. 1 and 2, the outer edge of the section 17 constitutes a guard for the edge 9 of the cutter blade 8.

The wall member 1 is provided with hexagonal end wall members 19 at its ends and the wall member 4 which is opposed to wall member 1 when the carton is erected is provided with end members 22. The other side wall members 2, 3 and 5 are provided with end flaps 20, 21 and 23 respectively and the inner wall members 11 and 12 are provided with end flaps 24 and 25 respectively.

The end members 19 are hexagonal shape and are dimensioned to provide complete end closures. The outer end members 22, in the embodiment illustrated, are dimensioned to approximately one-half the size of the end members 19 and have folding scores 26 aligned with the folding scores of the wall members 3 and 4.

The means for securing the flaps 20, 24 and 25 to the end wall member 19 are not illustrated but it will be understood that they are fixedly connected thereto as by adhesive when the carton is erected. The same applies to the connection for the end flaps 21 and 23 to the end wall members 22.

The score line 7 connecting the walls 2 and 3, illustrated conventionally, is desirably of somewhat greater depth than the other score lines and constitutes hinges for the two sections.

The side wall 5 is provided with tongues 28 resulting from the slits 27 which engage the notches 29 in the outer end wall members 22 when the walls are in erected position and these tongues also overlap the corresponding edges of the inner wall to support the walls as the carton is being handled.

A roll of the paper 34 is conventionally illustrated at 35 and is provided with a tubular support core 36 on which the paper is wound which is rather common practice in rolls of paper. The roll of paper enclosed in the carton is effectively sealed and when it is desired to use the same, the portion of the outer wall 6 is grasped at the inner side of the perforations 15 and the portion 17 grasped at one end and pulled to break its adhesive connection 18 to the inner wall member 11. The carton may then be opened, as indicated in FIG. 8, and the end of the roll of paper drawn outwardly over the inner wall member 11 and flap or extension 12, as is illustrated in FIG. 10.

Slits 16 facilitate the tearing or severing and result in tabs at the ends for convenient grasping.

The score line 31 connecting the tabs 25 to the inner wall members 12 are provided with slits 32 which provide supporting tabs 33 on the paper guide and support member 12. These coact to prevent collapsing and the tabs 33 further coact with the opening provided by the notches 29 to serve as frictional locks or keepers to retain the cover in closed position.

It will be noted that the complete carton is relatively compact and of such size that it may be conveniently grasped and its hexagonal walls resist clamping stress. In use, the user grasps the carton with the thumb of one hand in engagement with the remaining section of the outer wall 6. The stock is pulled out to the desired degree and the wall 6 is clamped down upon the underlying inner wall so that further withdrawal of stock is prevented and the stock may be severed on a straight line, as is indicated in FIG. 10.

The stock is effectively retained between the inner wall members 11 and 12 in the overlapping outer walls 5 and 6 and after a section has been removed there is an exposed edge portion of paper which may be conveniently grasped for withdrawing.

It will be understood that score lines, which are conventionally illustrated, are such as to provide hinging connections for the wall members and the end member flaps. The adhesive and adhesive resisting coating are also conventionally illustrated.

One of the advantages of this embodiment of our invention illustrated is that there is relatively little waste stock and the cartons may be conveniently packed for shipment and storage and they are not easily collapsed in grasping or handling, or packaging.

In the embodiment shown in FIG. 15, the tear strip portion 17 of the wall 6 has an infolded portion 17A which provides a double wall thickness that acts as a guard for the cutting edge of the blade 8.

We have illustrated and described our invention in a desirable embodiment thereof. We have not attempted to illustrate or describe other embodiments or adaptations as it is believed this disclosure will enable those skilled in the art to embody or adapt our invention in a highly practical form thereof.

What is claimed as new and desired to secure by Letters Patent is:

1. In combination with a roll of paper, a polygonal dispensing container therefor formed integrally of paperboard cut and scored to provide outer side walls of substantially uniform width, a cutter blade fixedly secured to one of said outer side walls with its cutting edge operatively extending therefrom, said container also including an inner side wall and paper guide and support member dimensioned to correspond to the outer walls integral with and extending from the edge of the wall from which said blade projects, the outer wall adjacent the wall to which said cutter blade is secured having a detachable section releasably connected to said inner wall, and end closures comprising end members integral with said walls, certain of which are disposed in overlapping relation to each other and fixedly connected and which support said side walls in erected angular relation, the outer end of the roll of paper being positionable in supported relation between said inner wall and paper guide and support member and the portion of said outer wall remaining after said detachable section has been removed.

2. In combination with a roll of paper, a polygonal dispensing container therefor formed integrally of paperboard cut and scored to provide outer side walls, a cutter blade fixedly secured to one of said outer side walls with its cutting edge operatively extending therefrom, said container also including an inner side wall and paper guide and support member integral with and extending from the edge of the wall from which said blade projects, the outer wall adjacent the wall to which said cutter blade is secured having a detachable section releasably connected to said inner wall, and end closures comprising end members integral with said walls, certain of which are disposed in overlapping relation to each other and connected to support said side walls in erected position, the outer end of the roll of paper being positionable in supported relation between said inner wall and paper guide and support member and the portion of said outer wall remaining after said detachable section has been removed.

3. A paper roll dispensing container of polygonal section formed integrally of paperboard cut and scored to provide outer side walls of substantially uniform width, a cutter blade fixedly secured to one of said walls with an edge operatively extending from one side edge thereof, an inner side wall and paper guide and support member integral with and extending from the edge of the wall to which said blade is secured, a second paper guide and support member connected to the inner edge of said inner wall member, the outer wall adjacent the wall to which said cutter blade is secured having a severing zone extending longitudinally thereof and providing a removable section adjacent said blade, said removable section being releasably secured to said inner wall, the remaining portion of said wall constituting a paper guide and holder member, and end closures comprising polygonal end wall members integrally and hingedly connected to the ends of the wall to which said blade is secured, the other walls having end members thereon, certain of which are connected to support adjacent walls in erected position.

4. A paper roll dispensing container of hexagonal section formed integrally of paperboard cut and scored to provide outer side walls of substantially uniform width, a cutter blade fixedly secured to one of said walls with an edge operatively extending from one side edge thereof, an inner side wall and paper guide and support member integral with and extending from the edge of the wall to which said blade is secured, the outer wall adjacent the wall to which said cutter blade is secured having a severing zone extending longitudinally thereof and providing a removable section being releasably secured to said inner wall, the remaining portion of said wall constituting a manually operable paper clamp member, and end closures coacting to support said walls in erected position.

5. A polygonal paper roll dispensing container of paperboard cut and scored to provide a plurality of outer side walls of substantially uniform width, a cutter blade fixedly secured to one of said walls with an edge operatively extending from one side edge thereof, an inner side wall and paper guide and support member integral with and extending from the edge of the wall to which said blade is secured, the outer wall adjacent the wall to which said cutter blade is secured having a portion thereof releasably secured to said inner wall and before its removal constituting a guard for said blade when the carton is erected, and end closure members integral with and hingedly connected to the ends of the walls, certain of said end closure members being supportedly connected to support said outer and inner walls in erected position.

6. A polygonal paper roll dispensing container of paperboard cut and scored to provide a plurality of outer side walls of substantially uniform width, a cutter blade fixedly secured to one of said walls with an edge operatively extending from one side edge thereof, an inner side wall and paper guide and support member integral with and extending from the edge of the wall to which said blade is secured, the outer wall adjacent the wall to which said cutter blade is secured having a portion thereof releasably secured to said inner wall, and end closure members integral with and hingedly connected to the ends of the walls, certain of said end closure members being supportedly connected to support said outer and inner walls in erected position.

7. A dispensing container of polygonal cross section and adapted to receive a roll of paper and formed integrally of paper board cut and scored to provide outer side walls of substantially uniform width, a cutter blade fixedly secured to one of said outer side walls with its cutter edge operatively extending therefrom, an inner side wall and paper guide and support member integral with and extending from the edge of the wall to which said blade is secured, the outer wall adjacent the wall to which said cutter blade is secured having a fracturing score extending longitudinally thereof and providing a removable section adjacent said blade, said removable section being detachably secured to said inner wall, and end closures comprising end members integral with said walls, certain of which are disposed in overlapping relation to each other and connected to support said side walls in erected dispensing use position.

8. A paper roll container of hexagonal cross section formed integrally of paperboard cut and scored to provide outer side walls of substantially uniform width, a cutter blade extending longitudinally of and fixedly secured to one of said outer walls, an inner side wall and paper guide and support member integral with and extending from the edge of the outer wall to which said blade is secured, the outer wall adjacent the wall to which said cutter blade is secured having a longitudinally extending fracturing zone providing a removable section being releasably secured to said inner wall at the outer side of said fracturing zone, the remaining portion of said outer end wall overlying said inner end wall constituting a manually engageable paper clamp, and end closure members acting to support said walls in erected position.

9. A paper roll container of polygonal cross section formed of paperboard cut and scored to provide a plurality of outer side walls and an inner side wall extending from the edge of one of said outer walls, a cutter blade disposed longitudinally of and fixed secured to and projecting from the edge of the outer wall from which said inner wall extends, said inner wall constituting a paper guide and support member, the outer wall overlapping said inner wall having a fracturing zone extending longitudinally thereof and spaced from its outer edge providing a removable section adjacent said blade, said fracturing zone comprising a plurality of longitudinally spaced slits and fracturing sections between and extending from the upper ends of the outer slits, portions of said removable section transversely aligned with said slits being adhesively connected to said inner wall, the remaining portion of said outer wall constituting a manually manipulatable paper clamp member, polygonal end walls integral with the wall to which said blade is attached, the walls adjacent the wall to which said blade is attached having end flaps disposed on the inner sides and fixedly secured to said end walls, the walls so connected constituting the first wall unit, the wall opposite said side wall to which said cutter blade is secured having end members integral therewith, and the walls adjacent said wall having end flaps disposed on and secured to the inner sides of end members, the walls so connected constituting a second wall unit which is hingedly connected to said first wall unit.

10. A dispensing container of polygonal cross section adapted to receive a roll of paper comprising outer side walls, a cutter blade fixedly secured to one of said walls with its cutter edge operatively extending therefrom, an inner side wall and paper guide and support member extending from the edge of the wall to which said blade is secured, the outer side wall overlapping said inner side wall having a fracturing zone extending longitudinally thereof and spaced from its outer edge providing a removable section adjacent said blade, said fracturing zone comprising a plurality of longitudinally spaced slits and fracturing sections between, portions of said removable section transversely aligned with said slits being adhesively connected to said inner wall, the remaining portion of said outer wall constituting a manually manipulatable paper clamp member, and end closures integral with said walls and acting to support the walls in erected position.

11. A dispensing container of polygonal cross section adapted to receive a roll of paper comprising outer side walls, a cutter blade fixedly secured to one of said walls with its cutter edge operatively extending therefrom, an inner wall and paper guide and support member extending from the edge of the wall to which said blade is secured, there being an outer wall overlapping said inner wall and having a fracturing zone extending longitudinally thereof and spaced from its outer edge providing a removable section adjacent said blade, spaced portions of said removable section being adhesively connected to said inner wall, said removable sections having transverse slits disposed at the ends of said adhered portions facilitating the flexing and removable manipulation of said removable sections, the remaining portion of said outer wall overlapping said inner wall and coacting therewith to provide a manually manipulatable paper clamp member, and end closures integral with said walls and acting to support the walls in erected position.

12. A dispensing container of polygonal cross section adapted to receive a roll of paper comprising outer side walls, a cutter blade fixedly secured to one of said walls with its cutter edge operatively extending therefrom, an inner side wall and paper guide and support member extending from the edge of the wall to which said blade is secured, the outer wall overlapping said inner wall having a fracturing zone extending longitudinally thereof and spaced from its outer edge providing a removable section adjacent said blade, spaced portions of said removable section of said outer wall being adhesively connected to said inner wall, the remaining portion of said outer wall overlapping said inner wall and coacting therewith to provide a manually manipulatable paper clamp member, and end closures integral with said walls and acting to support the walls in erected position.

13. A paper roll container of polygonal cross section formed integrally of paperboard cut and scored to provide a plurality of outer side walls of substantially uniform width, a cutter blade extending longitudinally of and fixedly secured to an outer side wall with an edge thereof operatively projecting from one edge of the wall to which it is secured, said container also including an inner side wall and paper guide and support member which extends from the edge of the outer wall from which said blade projects, the outer wall overlapping said inner wall and paper guide and support member having a fracturing zone providing a removable outer wall portion adjacent said blade which is detachably secured to said inner wall, the remaining portion of said outer wall adjacent said cutter blade overlapping said inner wall to retain the paper with a portion thereof projecting for grasping, and polygonal end walls connected to the wall to which said blade is attached, the walls adjacent the wall to which said end walls are attached having end flaps secured to said end walls, the walls so connected constituting a first wall unit, the wall opposite the side wall to which said cutter blade is secured having end members integral therewith and the adjacent walls having end flaps secured to said segmental end members, the walls so connected constituting a second wall unit hingedly connected to the first wall unit, the overlapping outer and inner wall members having detents and keepers coacting to releasably hold the wall units in their erected position after the sealing strip has been removed.

14. A paper roll container of polygonal cross section formed integrally of paperboard cut and scored to provide a plurality of outer side walls, a cutter blade extending longitudinally of and fixedly secured to an outer side wall with an edge thereof operatively projecting from one edge of the wall to which it is secured, said container also including an inner side wall and paper guide and support member which extends from the edge of the outer wall from which said blade projects, the outer wall overlapping said inner wall and said paper guide and support member having an inwardly folded outer edge portion and a fracturing zone at the inner side of said inwardly folded edge portion providing a removable portion adjacent said blade, the outer edge of which overlaps said projecting edge of the blade when the carton is erected, said removable portion being releasably connected to said inner wall, and end wall members supportedly connecting the wall to which said blade is attached to adjacent walls to support the walls so connected to constitute a first unitary wall unit, opposite walls being connected to constitute a second wall unit, the second wall unit being hingedly connected to the first wall unit.

15. A paper roll container of polygonal cross section formed integrally of paperboard cut and scored to provide a plurality of outer side walls, a cutter blade extending longitudinally of and fixedly secured to an outer side wall with an edge thereof operatively projecting from one edge of the wall to which it is secured, said container also including an inner side wall and paper guide and support member which extends from the edge of the outer wall from which said blade projects, the outer wall overlapping said inner wall and said paper guide and support member having a fracturing zone providing a removable portion adjacent said blade, the outer edge of which before its removal constitutes a guard for said projecting edge of the blade when the carton is erected, said removable portion being releasably connected to said inner wall, and end wall members supportedly connecting the wall to which said blade is attached to adjacent walls to support the walls so connected to constitute a first unitary wall unit, opposite walls being connected to constitute a second wall unit, the second wall unit being hingedly connected to the first wall unit.

16. A paper roll container of polygonal cross section formed integrally of paperboard cut and scored to provide a plurality of outer side walls of substantially uniform width, a cutter blade extending longitudinally of and fixedly secured to an outer side wall with an edge thereof operatively projecting from one edge of the wall to which it is secured, said container also including an inner side wall and paper guide and support member which extends from the edge of the outer wall from which said blade projects, the outer wall overlapping said inner wall and said paper guide and support member having a fracturing zone providing a removable portion adjacent said blade, the outer edge of which overlaps said projecting edge of the blade when the carton is erected, said removable portion being detachably attached to said inner wall, and end wall members supportedly connecting walls adjacent to the wall to which said blade is attached to adjacent walls to support the walls so connected to constitute a first wall unit, opposite walls being connected to constitute a second wall unit, the wall units being hingedly connected.

17. A paper roll container of polygonal cross section formed integrally of paperboard cut and scored to provide a plurality of outer side walls of substantially uniform width, a cutter blade extending longitudinally of and fixedly secured to an outer side wall with an edge thereof operatively projecting from one edge of the side wall to which it is secured, said container also including an inner side wall and paper guide and support member which extends from the edge of the outer wall from which said blade projects, the outer wall overlapping said inner wall and said paper guide and support member having a fracturing zone providing a removable portion adjacent said blade, said removable portion being detachably attached to said inner wall, and end wall members supportedly connecting walls adjacent to the wall to which said blade is attached to adjacent walls to support the walls so connected to constitute a first wall unit, opposite walls being connected to constitute a second wall unit, the wall units being hingedly connected.

18. A paper roll container of polygonal cross section formed integrally of paperboard cut and scored to provide a plurality of outer side walls of substantially uniform width, a cutter blade extending longitudinally of and fixedly secured to an outer side wall with an edge thereof operatively projecting from one edge of the side wall to which it is secured, said container also including an inner side wall and paper guide and support member which extends from the edge of the outer wall from which said blade projects, the outer wall overlapping said inner wall and said paper guide and support member having a fracturing zone providing a removable portion adjacent said blade, said removable portion being detachably attached to said inner wall, end wall members supportedly connecting walls adjacent to the wall to which said blade is attached to adjacent walls to support the walls so connected to constitute a first wall unit, opposite walls being connected to constitute a second wall unit, the wall units being hingedly connected, and means to hold the wall units in closed position after said removable section has been removed.

19. A paper roll container of polygonal cross section formed integrally of paperboard cut and scored to provide a plurality of outer side walls, a cutter blade extending longitudinally of and fixedly secured to an outer side wall with an edge thereof operatively projecting from the edge of the side wall to which it is secured, the container also including an inner side wall and paper guide and support member which extends from the edge of the outer wall from the edge of which said blade projects, the outer wall overlapping said inner wall and said paper guide and support member having a fracturing zone providing a removable portion adjacent the blade, said removable portion having longitudinally spaced portions thereof adhesively secured to said inner wall member, the inner wall member having scores therein surrounding the adhesive, said outer wall fracturing zone having spaced slits disposed at the inner sides of the spaced portions of the said removable outer portion adhered to said inner wall.

20. A polygonal paper roll dispensing container of paperboard stock cut and scored to provide hingedly connected side walls, a cutter blade fixedly secured to one of said side walls with an edge operatively extending from one side edge thereof, an inner side wall and paper guide and support member integral with and extending from the the edge of the side wall to which said blade is secured, the outer side wall adjacent the side wall to which said blade is secured overlapping and having a portion releasably secured to said inner side wall, end walls connected to the side wall to which said blade is attached, the side walls adjacent the side wall to which said blade is attached having end flaps supportedly secured to said end walls, the side and end walls so connected constituting a first wall unit, the side wall opposite the side wall to which said cutter blade is secured having end walls integral therewith, the adjacent side walls having end flaps secured to said end walls, the side walls so connected consitiuting a second unit which is hingedly connected to the first unit.

21. A polygonal paper roll dispensing container of paperboard stock cut and scored to provide hingedly connected side walls, a cutter blade fixedly secured to one of said side walls with an edge operatively extending from one side edge thereof, an inner side wall and paper guide and support member integral with and extending from the edge of the side wall to which said blade is secured, the outer side wall adjacent the edge of the side wall to which said blade is secured overlapping and having a portion releasably secured to said inner side wall, said inner side wall and the outer side wall connected to the outer edge of said side wall to which said blade is secured having integral end wall members and end flaps connected to support said side walls in their erected relation and coacting therewith to constitute a first wall unit, and a second wall unit comprising a plurality of side walls, one of which is hingedly connected to the outer edge of the side wall to which said blade is attached and coacting end flaps connected to constitute a second wall unit, the outer side wall having a portion secured to the inner side wall constituting the outer side wall on the swinging edge of said second wall unit.

*22. A container of polygonal cross section comprising side walls, an inner wall, an outer wall overlapping said inner wall and having a severance line extending longitudinally thereof and spaced from its outer edge providing a removable section, spaced portions of said removable section being adhesively connected to said inner wall, said removable section having transverse slits disposed at the ends of said adhered portions facilitating the flexing and removable manipulation of said removable section.*

*23. A container of polygonal cross section comprising side walls, an inner wall, an outer wall overlapping said inner wall and having a severance line extending longitudinally thereof and spaced from its outer edge providing a removable section, spaced portions of said removable section being adhesively connected to said inner wall, said removable section having transverse slits disposed at the ends of said adhered portions facilitating the flexing and removable manipulation of said removable section, the inner wall member having scores therein surrounding the adhesive.*

*24. A container according to claim 23, wherein said inner wall is provided with an adhesive resisting material intermediate the portions at which it is adhesively connected to said removable section.*

*25 A container of polygonal cross section comprising side walls, an inner wall, an outer wall overlapping said inner wall and having a severance line extending longitudinally thereof and spaced from its outer edge providing a removable section, spaced portions of said removable section being adhesively connected to said inner wall, said removable section having transverse slits disposed at the ends of said adhered portions facilitating the flexing and removable manipulations of said removable section, the remaining portion of said outer wall overlapping said inner wall, the inner wall member having scores therein surrounding the adhesive, said outer wall severance line having spaced slits disposed at the sides of the spaced portions of said removable outer portion adhered to said inner wall, and end closures integral with said walls and acting to support the walls in erected position.*

References Cited by the Examiner

The following references, cited by the Examiner, are of record in the patented file of this patent or the original patent.

UNITED STATES PATENTS

| | | | |
|---|---|---|---|
| 2,122,480 | 7/38 | Lowey | 229—33 |
| 2,507,403 | 5/50 | Gluck | 225—48 X |
| 2,659,525 | 11/53 | Wikstrom | 225—49 X |
| 2,680,558 | 6/54 | Mai | 229—51 |
| 3,137,424 | 6/64 | Finn et al. | 225—48 |

WILLIAM W. DYER, JR., *Primary Examiner.*